United States Patent [19]
Drum et al.

[11] 3,757,737
[45] Sept. 11, 1973

[54] MECHANICAL PICKUP DEVICE FOR ANIMAL DROPPINGS

[76] Inventors: Harvey R. Drum, 17186 Los Alimos, Granada Hills, Calif. 91344; Jeffry L. Witherill, 17605 Enadia Way, Van Nuys, Calif. 91406; Fredrick H. Rennwald, 3815 Edenhurst St., Los Angeles, Calif. 90039

[22] Filed: Mar. 3, 1972

[21] Appl. No.: 231,585

[52] U.S. Cl. .................................... 119/1, 294/55
[51] Int. Cl. ............................................ A47f 13/08
[58] Field of Search ............... 119/1; 294/1 R, 19 R, 294/19 A, 55; 15/257.1, 257.2, 257.6, 257.7, 257.9

[56] References Cited
UNITED STATES PATENTS

| | | | |
|---|---|---|---|
| 3,431,008 | 3/1969 | Narita | 15/257.1 UX |
| 3,139,299 | 6/1964 | Bowen | 15/257.1 UX |
| 2,695,488 | 11/1954 | Harrison, Jr. | 294/55 X |
| 507,826 | 10/1893 | Miller | 15/257.6 X |
| 2,999,259 | 9/1961 | Polner | 15/257.1 X |

*Primary Examiner*—Louis G. Mancene
*Assistant Examiner*—J. A. Oliff
*Attorney*—Robert M. Ashen et al.

[57] ABSTRACT

A mechanical device for sequentially loading multiple bodies of animal droppings from the ground into a disposable bag. The illustrated device has an elongated handle which carries a pickup means at its lower end. The pickup means includes means for releasibly holding a bag with the mouth of the bag held open in a generally vertical plane, and a movable paddle proportioned and arranged to engage and propel a body of animal droppings into the bag through the open mouth. The movement of the paddle is remotely controlled from the upper end of the handle by an manually movable lever which is operable to impart a rapid propelling movement to the paddle.

11 Claims, 4 Drawing Figures

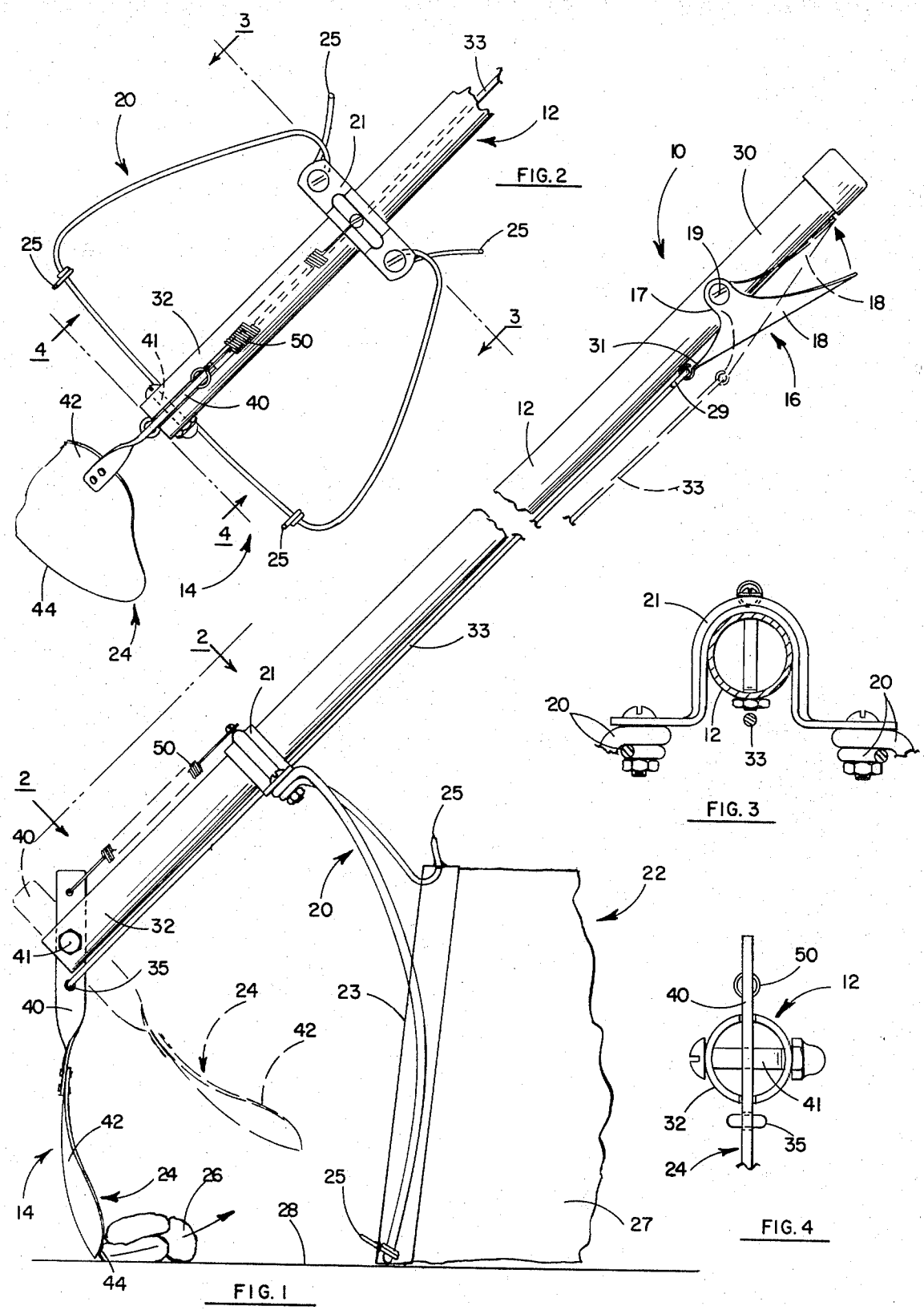

MECHANICAL PICKUP DEVICE FOR ANIMAL DROPPINGS

There are a variety of devices in the prior art for picking up animal droppings. Such devices have heretofore had various shortcomings. The device disclosed in U. S. Pat. No. 3,446,525 has an elongated handle and a pair of open frame members at its lower end which are adapted to hold a disposable film bag, with the bag opening downwardly. The device may be then placed over a body or pile of animal droppings and operated to move the frame members toward one another so as to enclose the animal droppings between portions of the film bag. Such a device, though effective for a single body of droppings, is not satisfactory for sequentially picking up more than one body of droppings. As the device is opened for a second load, the initial load will tend to fall out. The result is that progressively larger multiple bodies of such droppings would have to be picked up by the device at each subsequent operation or, alternately, the device would have to be unloaded by removing the disposable bag after each pickup and substituting a new bag for the next pickup. Also well known in the art are separate receptacle and pusher which are each individually mounted on handles and manually operated by the user to push the animal droppings into the receptacle for transportation. Such devices involve two separate parts and therefore two-handed operation. They also involve the problems of continually cleaning the contaminated utensils.

The device of the present invention contemplates a mechanical pickup device for animal droppings which is remotely operable from the upper end of an elongated handle and which has pickup means at the lower end of the handle capable of sequentially propelling a series of bodies of animal droppings from the ground into a disposable bag carried by the device.

The herein device comprises an elongated handle having an upper and a lower end. A pickup means is provided at the lower end of the handle. The pickup means comprises a stationary bag holding means mounted on the lower end of the handle adapted to releasibly support a disposable bag. The bag is maintained with its opening in a generally vertical plane. The pickup means further comprises a flipping paddle which is movably mounted on the lower end of the handle for movement relative to the bag holder means. The paddle is constructed and arranged so as to engage and propel the body of animal droppings into the bag through the open mouth Actuating means, remotely operable as by a lever at the upper end of the handle, is manually operated to impart rapid propelling movement to the paddle. The rapid flipping or propelling movement tends to place the animal droppings into the interior of the bag. The herein device may be provided with spring biasing means to return the mechanism to the ready position after each propelling movement of the paddle.

IN THE DRAWINGS

FIG. 1 is a side view of a mechanical pickup device comprising a presently preferred form of the invention.

FIG. 2 is a view of the lower end of the device taken generally along line 2—2 of FIG. 1.

FIG. 3 is a sectional view taken generally along line 3—3 of FIG. 2.

FIG. 4 is a sectional view taken generally along line 4—4 of FIG. 2.

Referring to the drawings, the mechanical pickup device 10 comprises an elongated handle 12, with a pickup means 14 at its lower end. An actuating means 16 is manually operable by the user, by means of a lever 18 at the upper end of the handle, to operate the pickup means. The illustrated pickup means 14 includes a stationary bag holding means 20 which releasibly holds a disposable bag 22 with its mouth 23 held at an open position. The pickup means 14 further includes a movable paddle 24 which is preferably essentially solid for engaging and propelling animal droppings 26 from the ground 28 into the bag through its open mouth 23. The lever 18 of the actuating means 16 is operable to effect rapid propelling movement of the paddle 24.

Now considering the illustrated device 10 in further detail, the elongated handle 12 may be constructed of any suitable material having the desired strength and wear characteristics as, for example, wood, metal or plastic. The handle 12 has an upper end designated 30, and a lower end designated 32. The handle should be of a reasonable length to extend from the position of the hand of the user to the ground level.

The drawings show the stationary bag holding means 20 in the form of an open wire frame. The frame 20 is secured at its upper end to the lower end of the handle by a bracket 21, and extends downwardly therefrom. As shown in FIG. 1, the plane of the frame is offset somewhat rearwardly from the axis of the handle to facilitate the operation of the device as will be explained more fully below. The frame 20 releasibly supports the disposable bag 22. The bag may be of any desired suitable material such as paper or plastic or wax coated paper. However, bags of plastic film are presently preferred because of their low cost, relative strength and durability and resistance to odor and moisture. The illustrated frame 20 is generally in a looped figuration, although it might be square or have any other configuration which may be convenient for fabrication or manufacture. Peripheral portions around the mouth or opening of the bag are impaled on four prongs or hooks 25 so that the bag is releasibly mounted as shown in the drawings, with the open mouth 23 of the bag disposed about the frame. The remainder 27 of the bag extends rearwardly or outwardly from the frame 20 as also shown in the drawings. Other suitable means for releasibly mounting or securing the bag on the frame may be alternately provided. For example, spring biased or resilient clips might be provided for engaging edge portions of the bag.

The illustrated paddle 24 for engaging and propelling the droppings, has an upper portion 40 and a lower portion 42. The upper portion 40 of the paddle, is pivotally connected at 41 to the lower end of the handle 12 for movement of the lower portion 42 toward and away from the frame 20. The lower portion 42 of the paddle 24 is generally spoon shaped, having an arcuate lower edge 44 that is also scooped or concave from side to side, and from top to bottom.

The actuating means 16 includes the lever 18 which is pivotally mounted adjacent the upper end of the handle 12. The lever 18 is connected by a mechanical linkage of the actuating means to the paddle 24. More particularly, the lever 18 is pivotally mounted through a pair of short arm portions 17 on the handle for pivotal movement about axis 19. A lower end 31 of the lever 18 is pivotally connected to the upper end 29 of an elongated control rod 33. The lower end 35 of the control rod 33 is pivotally connected to the portion 40 of the paddle just below the pivot point 41. Thus, when the lever 18 is moved by the hand of the operator in the direction indicated by the arrow in FIG. 1, the lower portion 42 of the paddle is moved toward the frame 20. The lever 18 and the paddle 24 are then in the positions shown in broken line in FIG. 1. It will be noted that the end of the lever 18 moves only about 1/4 the distance that the lower end of the paddle moves. Due to this multiplied mechanical advantage, a small rapid movement imparted to the lever causes a rapid flipping or impelling movement to be imparted to the paddle. This causes the paddle to engage and flip or propel the body of animal droppings through the open mouth 23 of the bag 22 and into an interior area of the bag. Thus, when the pickup device is raised, the droppings will fall to the bottom of the bag to make room for additional material. The device operates to permit receiving additional loads of material until the bag has been substantially filled. After usage of the bag 22 is completed or the bag has been filled, it is simple to remove the bag from the hooks 25 around the frame, and close its upper end to physically contain the animal droppings and also retain the odors within the bag. A new bag may then be placed on the pickup device for subsequent usage.

The paddle may be normally biased to the ready position as shown in FIG. 1. For example, a spring 50 may be connected between the bracket 21 and the paddle portion 40 above the handle 12. Thus, after each actuation of the lever 18 and movement of the paddle 24 toward the bag, the lever may be released and the spring 50 will move the paddle back to the ready position. The lever 18 will also be returned to its ready position for further operation through the connecting rod 33.

The frame, the paddle, and the actuating mechanism may be made of any suitable material. For example, plastic which is light-weight and durable, light-weight, inexpensive, and corrosion resistant may be used. However, plastic is generally not as strong or durable as heavier and more expensive material, such as aluminum or stainless steel.

The movable paddle may take various alternate forms. However, it has been found that the illustrated configuration provides a highly effective operation for propelling animal droppings. In this regard, the paddle not only engages and moves the droppings, but also tends to raise them upwardly somewhat so that the droppings are adequately propelled into the interior of the bag rather than merely being moved to the opening. Further in this regard, it will be noted that the lower portion of the paddle is also disposed at a slight angle to the upper portion so that a further upward or flipping movement is imparted to the engaged droppings.

In general, various alternate configurations of frame, handle, and paddle may be utilized to hold a bag open and generally facing the droppings to be picked up, and to impart a generally upward flip or propelling motion to the droppings to insure that they move completely through the opening of the bag and into the interior thereof.

We claim:

1. A device for picking up animal droppings, comprising:
  a. an elongated handle having an upper end and a lower end,
  b. pickup means at the lower end of the handle comprising:
    1. a stationary bag holder means mounted on the lower end of the handle for releasably supporting a disposable bag with the mouth of the bag open, said holder means including bag-engaging means for engaging and holding the portion of the bag around its open mouth, said bag-engaging means being disposed in a generally upright reference plane and being arranged in said plane around an open center area at which the open mouth of the bag is disposed, and
    2. means movably mounted on the lower end of the handle and generally aligned with said center area for engaging and propelling a body of animal droppings into the open mouth of a bag held by said bag-engaging means, said propelling means having an upper portion and a lower portion, said propelling means being pivotally mounted at said upper portion for propelling movement of said lower portion toward said open center area of said reference plane in a path having an upward component of movement, the region between said propelling means and said center area being open and unobstructed for free flight of propelled animal droppings, and
  c. actuating means remotely operable from the upper end of the handle to impart propelling movement to said propelling means.

2. The device of claim 1 wherein said propelling means comprises a paddle having a ready position spaced from and generally parallel to said reference plane, said paddle being movable toward said reference plane through a predetermined angle.

3. The device of claim 2 wherein said angle is substantially less than 90°.

4. The device of claim 2 wherein said angle is less than 45°.

5. The device of claim 2 wherein said angle is about 40°.

6. The device of claim 1 wherein the lowermost portion of said propelling means is generally vertically aligned with the lowermost portion of said center area.

7. The device of claim 1 wherein said lower portion is spaced from said reference plane after said propelling means has completed its propelling movement toward said center area.

8. The device of claim 1 wherein said propelling means is a paddle which is centrally recessed from side to side.

9. The device of claim 1 wherein said propelling means is a paddle which is centrally recessed from end to end.

10. The device of claim 9 wherein said paddle is also centrally recessed from side to side.

11. The device of claim 1 wherein said bag engaging means comprises an open loop.

* * * * *